(12) United States Patent
Riahi et al.

(10) Patent No.: US 8,206,108 B2
(45) Date of Patent: Jun. 26, 2012

(54) TURBINE BLADES AND METHODS OF MANUFACTURING

(75) Inventors: Ardeshir Riahi, Scottsdale, AZ (US); Kin Poon, Tempe, AZ (US); David Chou, Phoenix, AZ (US); Malak F. Malak, Tempe, AZ (US)

(73) Assignee: Honeywell International Inc., Morristown, NJ (US)

( * ) Notice: Subject to any disclaimer, the term of this patent is extended or adjusted under 35 U.S.C. 154(b) by 1291 days.

(21) Appl. No.: 11/953,489

(22) Filed: Dec. 10, 2007

(65) Prior Publication Data

US 2009/0148305 A1   Jun. 11, 2009

(51) Int. Cl.
*F01D 5/18* (2006.01)

(52) U.S. Cl. ..................... 416/97 R; 416/228

(58) Field of Classification Search .......... 416/228, 416/224, 92, 97 R
See application file for complete search history.

(56) References Cited

U.S. PATENT DOCUMENTS

| | | | |
|---|---|---|---|
| 4,390,320 A * | 6/1983 | Eiswerth | 416/224 |
| 4,529,357 A | 7/1985 | Holland | |
| 4,589,823 A * | 5/1986 | Koffel | 416/224 |
| 5,039,562 A | 8/1991 | Liang | |
| 5,192,192 A | 3/1993 | Ourhaan | |
| 5,688,107 A * | 11/1997 | Downs et al. | 416/228 |
| 6,179,556 B1 * | 1/2001 | Bunker | 416/97 R |
| 6,190,129 B1 | 2/2001 | Mayer et al. | |
| 6,231,307 B1 | 5/2001 | Correia | |
| 6,422,821 B1 | 7/2002 | Lee et al. | |
| 6,478,535 B1 | 11/2002 | Chung et al. | |
| 6,527,514 B2 | 3/2003 | Roeloffs | |
| 6,602,052 B2 | 8/2003 | Liang | |
| 6,634,860 B2 | 10/2003 | Lee et al. | |
| 6,981,846 B2 | 1/2006 | Liang | |
| 6,994,514 B2 | 2/2006 | Soechting et al. | |
| 7,192,250 B2 | 3/2007 | Boury et al. | |
| 7,351,035 B2 | 4/2008 | Deschamps et al. | |
| 7,473,073 B1 | 1/2009 | Liang | |

(Continued)

FOREIGN PATENT DOCUMENTS

EP    1281837 A1    2/2003

(Continued)

OTHER PUBLICATIONS

EP Search Report, EP 11174595.6-2321 dated May 10, 2011.

*Primary Examiner* — Richard Edgar
(74) *Attorney, Agent, or Firm* — Ingrassia Fisher & Lorenz, P.C.

(57) ABSTRACT

A turbine blade includes a convex suction side wall, a concave pressure side wall, a tip wall, an internal cooling circuit, and a plurality of tip edge channels. The tip wall is recessed from a first tip edge of the suction side wall and a second tip edge of the concave pressure side wall to define a suction side wall tip section and a pressure side wall tip section, and the suction side wall tip section is shorter than the pressure side wall tip section. The internal cooling circuit is formed at least partially between the convex suction side wall, the concave pressure side wall, and the tip wall. The plurality of tip edge channels formed through the first tip edge of the convex suction side wall extend to the internal cooling circuit. Methods of manufacturing turbine blades are also provided.

15 Claims, 5 Drawing Sheets

U.S. PATENT DOCUMENTS

| | | |
|---|---|---|
| 7,494,319 B1 | 2/2009 | Liang |
| 7,530,788 B2 | 5/2009 | Boury et al. |
| 7,922,451 B1 * | 4/2011 | Liang .................. 416/97 R |
| 2003/0021684 A1 | 1/2003 | Downs et al. |
| 2005/0232771 A1 | 10/2005 | Harvey et al. |
| 2006/0120869 A1 | 6/2006 | Wilson et al. |
| 2007/0237637 A1 | 10/2007 | Lee et al. |
| 2009/0148305 A1 | 6/2009 | Riahi et al. |

FOREIGN PATENT DOCUMENTS

| | | |
|---|---|---|
| EP | 1422383 A2 | 5/2004 |
| EP | 1726783 A1 | 11/2006 |
| EP | 1736636 A1 | 12/2006 |

* cited by examiner

TURBINE BLADES AND METHODS OF MANUFACTURING

STATEMENT REGARDING FEDERALLY SPONSORED RESEARCH OR DEVELOPMENT

This inventive subject matter was made with Government support under USAF F33615-03-D-2355 awarded by the United States Air Force. The Government has certain rights in this inventive subject matter.

TECHNICAL FIELD

The inventive subject matter relates to turbines and, more particularly, to turbine blades and methods of manufacturing turbine blades.

BACKGROUND

Gas turbine engines, such as turbofan gas turbine engines, may be used to power various types of vehicles and systems, such as, for example, aircraft. Typically, these engines include turbine blades (or airfoils) that are impinged by high-energy compressed air that causes a turbine of the engine to rotate at a high speed. Consequently, the blades are subjected to high heat and stress loadings which, over time, may reduce their structural integrity.

Modern aircraft jet engines have employed internal cooling systems in the blades to maintain the blade temperatures within acceptable limits. Typically, the blades are air cooled using, for example, bleed air from a compressor section of the engine. The air may enter the blade near a blade root, and then flow through a cooling circuit formed in the blade. The cooling circuit typically consists of a series of connected cooling passages that form serpentine paths, which increase the cooling effectiveness by including an extended flow path along which the air may travel.

One exemplary cooling system is multi-walled and includes independent cooling circuits for surfaces of the blade. The cooling system may be configured to cool a pressure side wall, a suction side wall, and a tip wall, to thereby control specific heat load distributions thereon. The walls form intricate serpentine passages in an interior of the blade through which the cooling air flows. The serpentine passages may include pin fins, turbulators, turning vanes, and other structures therein. In some cases, a tip recess may be formed between the outer surfaces of the suction side wall, the pressure side wall, and the tip wall. The tip recess increases cooling capabilities of the tip wall to an extent and may also increase turbine engine efficiency by reducing an amount of leakage flow over the blade tip, which is driven by a pressure differential between the pressure side and suction side of the airfoil. However, as engine operating temperatures increase, improved cooling of the tip wall may be desired.

Accordingly, there is a desire for a blade having improved tip wall cooling over conventional blades. Additionally, it is desirable for the blade to be relatively simple and inexpensive to manufacture. Moreover, it is desirable for the improved blade to be capable of being retrofitted into existing systems.

BRIEF SUMMARY

Turbine blades and methods for manufacturing turbine blades are provided.

In an embodiment, by way of example only, a turbine blade includes a convex suction side wall, a concave pressure side wall, a tip wall, an internal cooling circuit, and a plurality of tip edge channels. The convex suction side wall includes a first tip edge. The concave pressure side wall is opposite the convex suction side wall and includes a second tip edge. The tip wall extends between the convex suction side wall and the concave pressure side wall and couples the convex suction side wall to the concave pressure side wall. The tip wall is recessed from the first tip edge of the suction side wall and the second tip edge of the concave pressure side wall to define a suction side wall tip section and a pressure side wall tip section, and the suction side wall tip section is shorter than the pressure side wall tip section. The internal cooling circuit is formed at least partially between the convex suction side wall, the concave pressure side wall, and the tip wall. The plurality of tip edge channels formed through the first tip edge of the convex suction side wall extend to the internal cooling circuit.

In another embodiment, by way of example only, a turbine blade includes a convex suction side wall, a concave pressure side wall, a tip wall, an internal cooling circuit, a plurality of tip edge channels, and a plurality of pressure wall openings. The convex suction side wall includes a first tip edge. The concave pressure side wall is opposite the convex suction side wall and includes a second tip edge. The tip wall extends between the convex suction side wall and the concave pressure side wall and couples the convex suction side wall to the concave pressure side wall. The tip wall is recessed from first the tip edge of the suction side wall and the second tip edge of the concave pressure side wall to define a suction side wall tip section and a pressure side wall tip section. The suction side wall tip section is shorter than the pressure side wall tip section. The internal cooling circuit is formed at least partially between the convex suction side wall, the concave pressure side wall, and the tip wall. The plurality of tip edge channels formed through the first tip edge of the convex suction side wall extends to the internal cooling circuit. The plurality of pressure wall openings is formed through the concave pressure side wall to communicate with the internal cooling circuit.

In still another embodiment, by way of example only, a method is provided for manufacturing a turbine blade having an internal cooling circuit and an airfoil shape defined by a convex suction side wall, a concave pressure side wall, a tip wall, a leading edge, a trailing edge, a root and a tip recess, the convex suction side wall, the concave pressure side wall, and the tip wall each including a surface that defines at least a portion of an internal cooling circuit, the convex suction side wall and the concave pressure side wall each having a tip edge, the tip wall recessed from a first tip edge of the suction side wall and a second tip edge of the pressure side wall to define a suction side wall tip section and a pressure side wall tip section, respectively, the suction side wall tip section being shorter in height than the pressure side wall tip section. The method includes forming cores shaped substantially similarly to the internal cooling circuit and to a portion of the tip recess. The turbine blade is then formed around the cores, the blade having an outer surface defined by a convex suction side wall, a concave pressure side wall, a tip wall, a leading edge, a trailing edge, a root and a tip recess, the convex suction side wall, the concave pressure side wall, and the tip wall each including a surface that defines at least a portion of an internal cooling circuit, the convex suction side wall and the concave pressure side wall each having a tip edge, the tip wall spaced apart from the tip edge of the suction side wall and the tip edge of the pressure side wall to define a suction side wall tip section and a pressure side wall tip section. The cores are removed from the turbine blade to expose the internal cooling circuit of the turbine blade. A portion of the tip section of the convex suction side wall is removed such that the suction side wall tip section is shorter in height than the pressure side wall tip section. At least one tip edge channel is machined through the convex suction side wall from the first tip edge thereof to the internal cooling circuit of the turbine blade.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
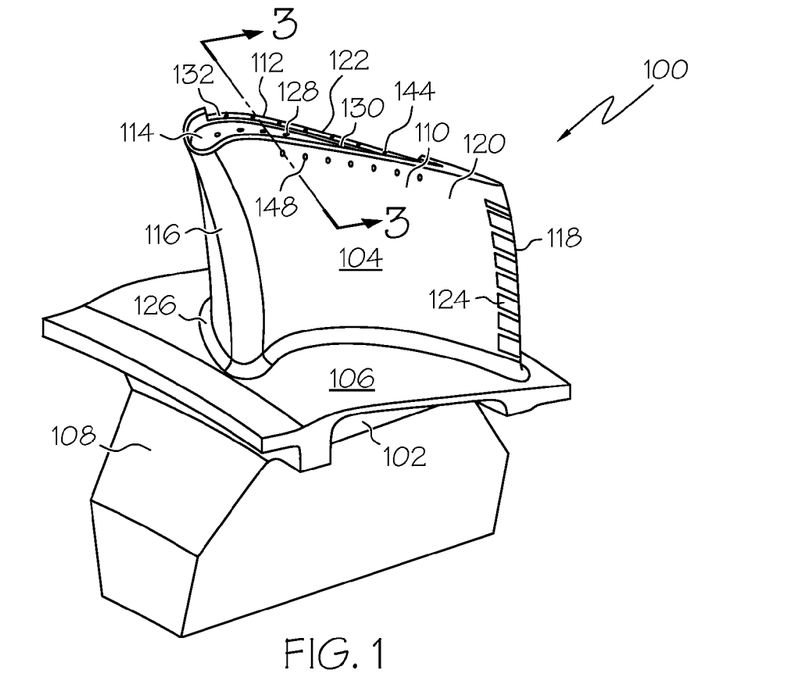
FIG. 1 is a perspective, pressure side view of a turbine blade, according to an embodiment.
Figure 2:
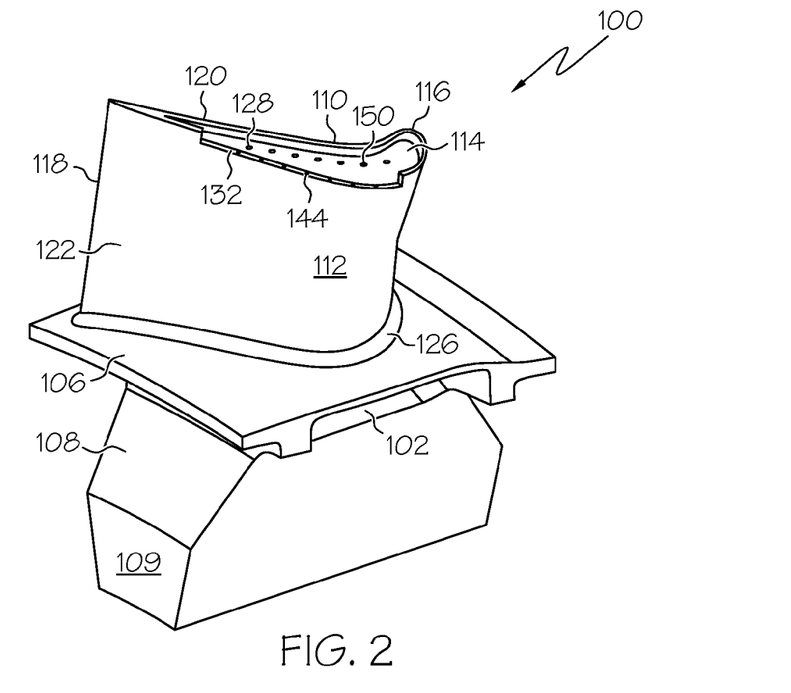
FIG. 2 is a perspective, suction side view of turbine blade of FIG. 1, according to an embodiment.

FIG. 1 is a perspective, pressure side view of a turbine blade 100, according to an embodiment, and FIG. 2 is a perspective, suction side view of the turbine blade 100, according to an embodiment. The turbine blade 100 may include a shank 102, an airfoil 104, a platform 106, and a root 108. The platform 106 is configured to radially contain turbine airflow. The root 108 is used to attach the turbine blade 100 to a turbine rotor disk (not illustrated). The root 108 may be machined into any one of numerous other shapes suitable for attaching the turbine blade 100 to the turbine disk. For example, the root 108 may include a firtree (not shown) machined therein.

The airfoil 104 is generally made up of a concave, pressure side wall 110, a convex, suction side wall 112 opposite the concave, pressure side wall 110, and a tip wall 114 extending between and coupling the pressure sidewall 110 and the suction side wall 112 together. The walls 110, 112, 114 may each have varying thicknesses along their lengths. In an embodiment, the walls 110, 112, 114 may have thicknesses that range between about 0.20 mm and 1.80 mm. In still other embodiments, the walls 110, 112, 114 may each have equal thicknesses, while in other embodiments the walls 110, 112, 114 may each have substantially equal thickness. In any case, the walls 110, 112, 114 have outer surfaces that together define an airfoil shape. The airfoil shape is made up of a leading edge 116, a trailing edge 118, a pressure side 120 along the concave, pressure side wall 110, a suction side 122 along the convex, suction side wall 112, one or more trailing edge slots 124, an airfoil platform fillet 126, and a tip recess 128.

Figure 3:
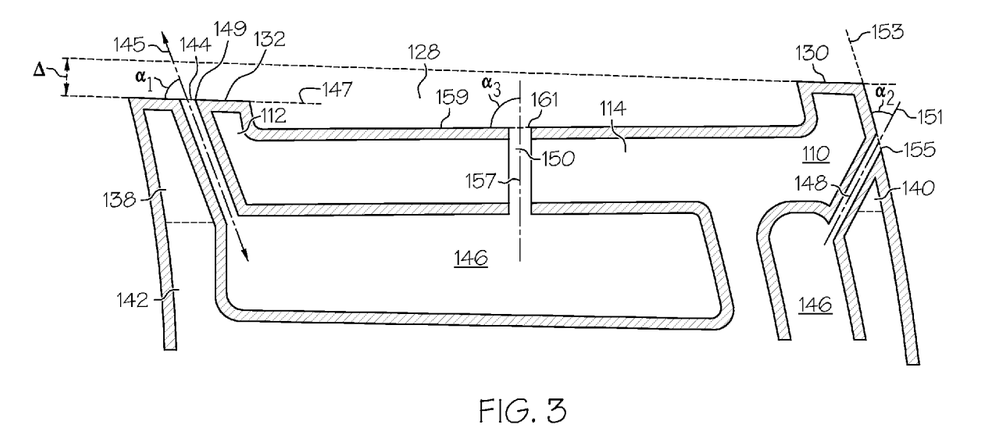
FIG. 3 is a close up cross-section view of a tip wall portion of the blade shown in FIGS. 1 and 2, according to an embodiment.

FIG. 3 is a close up cross-sectional view of a tip region of the turbine blade 100 taken along line 3-3 in FIG. 1, according to an embodiment. To cool the tip region of the turbine blade 100, the tip recess 128 and openings may be included therein.

With reference to FIGS. 1-3, the tip recess 128 is defined by inwardly facing outer surfaces of the side walls 110, 112 and the tip wall 114, which is recessed from tip edges 130, 132 of the side walls 110, 112. The tip wall 114 also serves as a boundary at which a tip section 138 on the suction side wall 112 begins and at which a tip section 140 on the pressure side wall 110 begins. In an embodiment, at least a portion of the tip section 138 of the suction side wall 112 is shorter than the tip section 140 of the pressure side wall 110 so that a height difference ("Δ") exists there between. For example, the shorter portion of the suction side wall tip section 138 may extend along an entire length of the suction side wall 112. In another example, the shorter portion of the suction side wall tip section 138 may extend between a first location that is a distance downstream from the leading edge 116 and a second location that is distance upstream from the trailing edge 118. In an embodiment, the first location may be between about 1.80 mm and about 2.10 mm from the leading edge 116. In another embodiment, the second location may be between about 9.00 mm and about 9.30 mm from the trailing edge 118. It will be appreciated that the first and second locations may be located at other distances from the leading and trailing edges 116, 118, respectively, in other embodiments.

By including the shorter suction side wall tip section 138, the turbine blade 100, in particular, the suction side wall 112, may be less likely to contact adjacent components during engine operation. Additionally, the taller tip section 140 of the pressure side wall 110 may shield the tip section 138 of the suction side wall 112 from heat during operation. Suitable height differences between the tip section 138 of the suction side wall 112 and the tip section 140 of the pressure side wall 110 may include measurements between about 0.05 mm and about 0.40 mm. In another embodiment, the tip section 138 of the suction side wall 112 may be about 0.12 mm shorter than the pressure side wall tip section 140. In still other embodiments, the height difference may be smaller or larger.

The tip section 138 of the suction side wall 112 may also be thicker than the tip section 140 of the pressure side wall 110. In an embodiment, the suction side wall tip section 138 may be about 1.30 to about 2.7 times thicker than the pressure side wall tip section 140. For example, if the pressure side wall tip section 140 is between about 0.38 mm and about 0.76 mm in thickness, then the suction side wall tip section 138 may be about 1.00 mm and about 1.05 mm in thickness. In other embodiments, the difference in thickness and the thickness measurements may be greater or less.

The suction side wall tip section 138 may also be thicker than the section 142 of the side wall 112 below the tip wall 114. In an embodiment, the suction side wall tip section 138 may be between about 1.3 and 2.7 times thicker than the other section 142. For example, if the suction side wall tip section 138 is between about 1.00 mm and about 1.05 mm in thickness, then the other section 142 may be between about 0.35 mm and about 0.80 mm in thickness. In other embodiments, the difference in thickness and the thickness measurements may be greater or less.

As mentioned briefly above, the turbine blade 100 may include openings also. In one example, a plurality of tip edge channels 144 (only one of which is shown in FIG. 3) may be formed on the suction side wall 112 to provide improved cooling to the tip region of the turbine blade 100. In particular, the tip edge channels 144 may be formed in the tip section 138 of the suction side wall 112 and, in an embodiment, may extend from the tip edge 132 of the suction side wall 112 into an internal cooling circuit 146 (described in more detail below) of the turbine blade 100.

In an embodiment, the tip edge channels 144 may be each substantially cylindrical in shape and are thus each symmetrically disposed about a central axis 145. However, other shapes and positioning of the tip edge channels 144 may alternatively be implemented. Each tip edge channel 144 may be formed at a discharge angle ($\alpha_1$). In an example, the discharge angle ($\alpha_1$) may be an angle that may be measured between a plane 147 that is tangent to its outlet port 149 (e.g., the tip edge 132) and the tip edge channel central axis 145. In some embodiments, the discharge angle ($\alpha_1$) is substantially non-perpendicular to plane 147 and may be between about 20 degrees and about 90 degrees. In another embodiment, the discharge angle ($\alpha_1$) may be different for different tip edge channels 144. In still another embodiment, the discharge angle ($\alpha_1$) may be substantially the same for all of the tip edge channels 144.

Each of the tip edge channels 144 has a diameter. In an embodiment, one or more of the tip edge channels 144 may have diameters between about 0.25 mm and about 0.40 mm. In another embodiment, the tip edge channels 144 have diameters that are between about one half to about one third the thickness of the suction side wall tip section 138. In still other embodiments, the diameters of the tip edge channels 144 may be smaller or larger, and their particular sizes may depend on the particular thickness of the suction side wall tip section 138 and/or environment in which they operate (blockage due to dirt or sand) and/or maximum available flow and/or constraints due to manufacturing capabilities (i.e. minimum possible hole machining capabilities). Moreover, although the tip edge channel 144 in FIG. 3 is shown as being formed substantially halfway between the outwardly and inwardly facing surfaces of the suction side wall 112, the channels may be formed in other locations therebetween, in other embodiments. Additionally, although one tip edge channel is shown in FIG. 3 and seven tip edge channels are shown in FIGS. 1 and 2, more or fewer may be included in other embodiments.

With reference now to FIGS. 1-3, to cool the pressure side wall 110, a plurality of pressure wall openings 148 may be included. The pressure wall openings 148 may extend from an outwardly facing surface of the pressure side wall 110 to the internal cooling circuit 146. In an embodiment, one or more of the pressure wall openings 148 extend from an outwardly facing surface of the pressure side wall tip section 140 to the internal cooling circuit 146.

The pressure wall openings 148 may be each substantially cylindrical in shape and are thus each symmetrically disposed about a central axis 151. However, other shapes and positioning of the pressure wall openings 148 may alternatively be implemented. Each pressure wall opening 148 may be formed at a discharge angle ($\alpha_2$). In an example, the discharge angle ($\alpha_2$) may be an angle that may be measured between a plane 153 that is tangent to its outlet port 155 (e.g., an outer surface of the pressure side wall 110) and the pressure wall opening central axis 151. In some embodiments, the discharge angle ($\alpha_2$) is substantially non-perpendicular to plane 153 and may be between about 20 degrees and about 60 degrees. In another embodiment, the discharge angle ($\alpha_2$) may be different for different pressure wall openings 148. In still another embodiment, the discharge angle ($\alpha_2$) may be substantially the same for all of the pressure wall openings 148.

Each of pressure wall openings 148 has a diameter. In an embodiment, pressure wall openings 148 may have diameters between about 0.25 mm and about 0.40 mm. However, in other embodiments, the diameters may be smaller or larger, depending on the total number of pressure wall openings 148 that are included on the pressure side wall 110 and the temperatures to which the pressure side wall 110 will be exposed.

Although seven pressure wall openings 148 are shown in FIG. 1 and a single opening 148 is shown in FIG. 3, it will be appreciated that more or fewer may alternatively be included in other embodiments. Furthermore, although a single row of openings 148 is shown, more or fewer rows may alternatively be included. Moreover, although the pressure wall openings 148 are shown as forming a row, this may not be the case in other embodiments.

In some embodiments, the turbine blade 100 may include one or more tip wall openings 150 in the tip wall 114. The tip wall openings 150 extend from an outer surface of the tip wall 114 to the internal cooling circuit 146 and may have a diameter that between about 0.25 mm and 0.40 mm. In other embodiments, the openings 150 may be larger or smaller. Although several tip wall openings 150 are shown in FIGS. 1 and 2 and one tip wall opening 150 is shown in FIG. 3, more or fewer may be employed in other embodiments. The tip wall openings 150 may be each substantially cylindrical in shape and are thus each symmetrically disposed about a central axis 157. However, other shapes and positioning of the tip wall openings 150 may alternatively be implemented. Each tip wall opening 150 may be formed at a discharge angle ($\alpha_3$). In an example, the discharge angle ($\alpha_3$) may be an angle that is measured between a plane 159 that is tangent to its outlet port 161 and the tip wall opening central axis 157. In some embodiments, the discharge angle ($\alpha_3$) is substantially non-perpendicular to plane 159 and may be between about 20 degrees and about 160 degrees. In another embodiment, the discharge angle ($\alpha_3$) may be different for different tip wall openings 150. In still another embodiment, the discharge angle ($\alpha_3$) may be substantially the same for all of the tip wall openings 150.

Although tip wall openings 150 are shown as being located in particular positions along the tip wall 114, they may alternatively be located in other positions in other embodiments. Furthermore, although a single row of openings 150 is shown, more or fewer rows may alternatively be included. In still other embodiments, the tip wall openings 150 may not be included in the tip wall 114 at all.

As mentioned above, the tip edge channels 144, the pressure wall openings 148, and the tip wall openings 150 communicate with the internal cooling circuit 146. As alluded to above, the internal cooling circuit 146 is configured to cool the pressure side wall 110, suction side wall 112, and tip wall 114 by directing air from one or more inlets formed in the root 108, to the trailing edge slots 124, the tip edge channels 144, the pressure wall openings 148, and/or the tip wall openings 150. To do so, in an embodiment, the internal cooling circuit 146 may be made up of one or more cavities formed by the inner surfaces of the pressure side wall 110, suction side wall 112, and tip wall 114.

Figure 4:
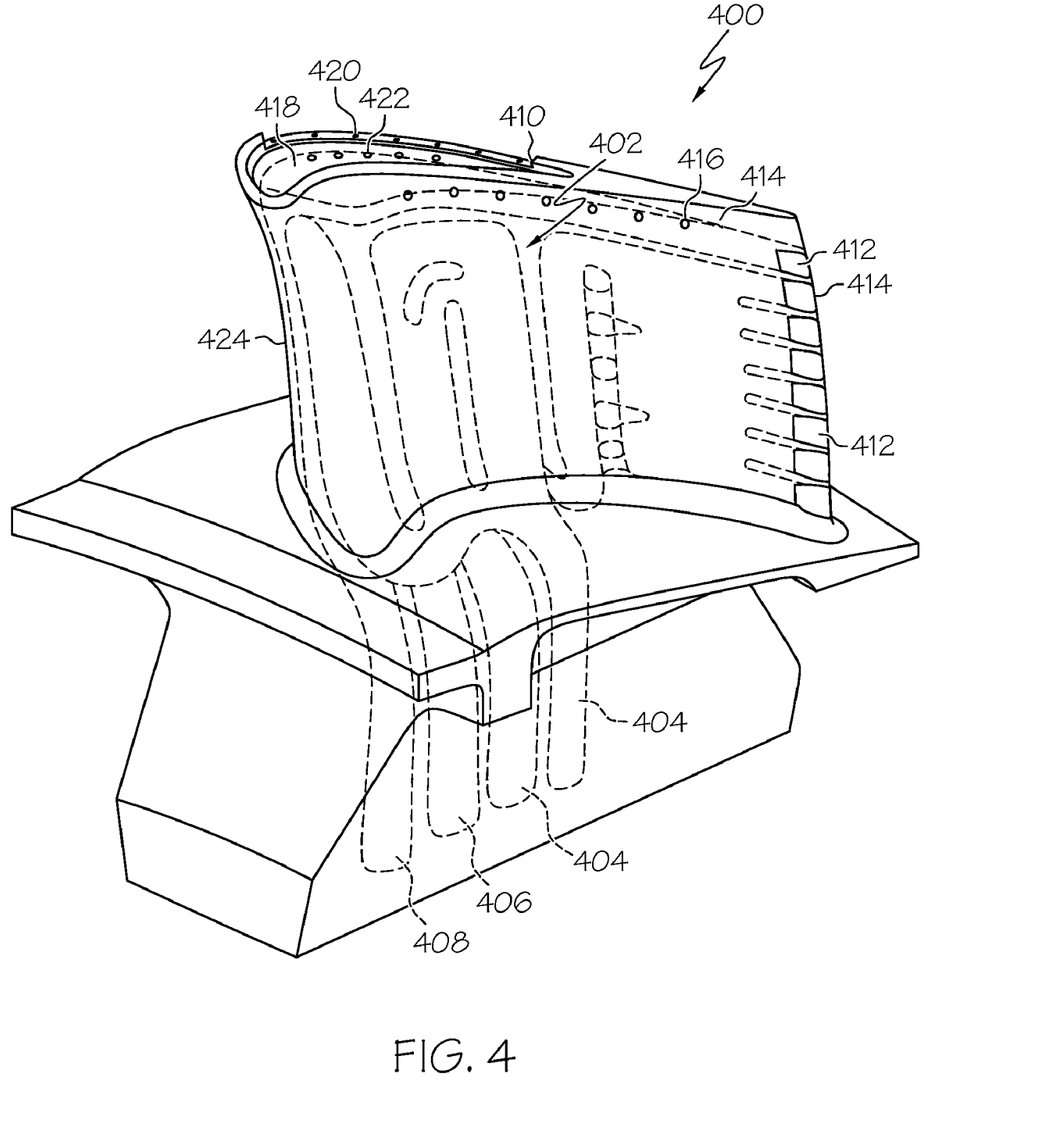
FIG. 4 is a perspective view of a blade including an internal cooling circuit with multiple flow circuits in phantom, according to an embodiment.
Figure 5:
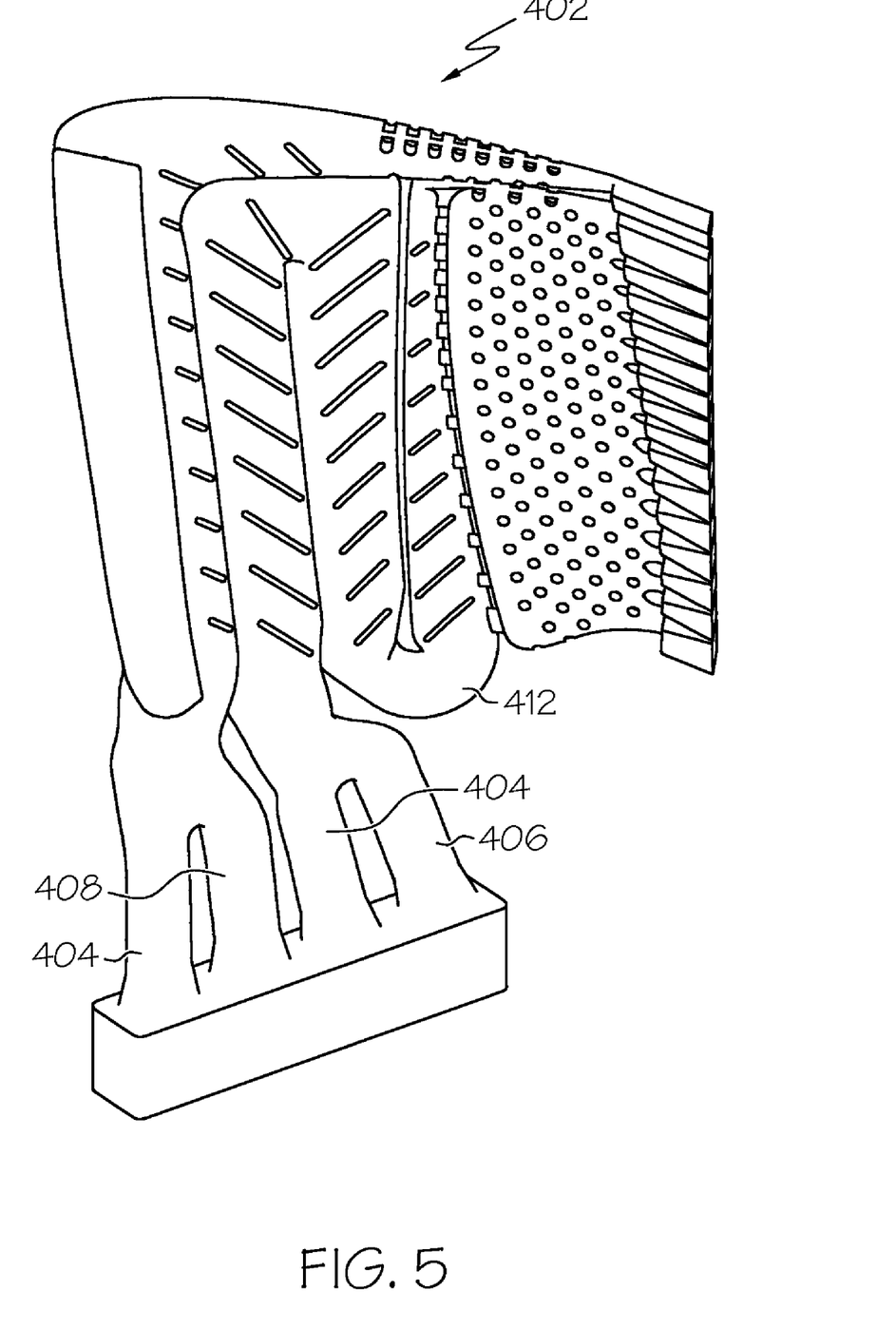
FIG. 5 is a perspective view of a reverse image of an internal cooling circuit, according to an embodiment.

In an embodiment, the internal cooling circuit 146 may be made up of single flow circuit. For example, the pressure side wall 110, suction side wall 112, and tip wall 114 may make up a single cavity that makes up the single flow circuit. In other embodiments, a single interior wall (not shown) may be disposed between the pressure side wall 110 and suction side wall 112 to form two flow circuits that make up the internal cooling circuit 146. In another embodiment, the internal cooling circuit 146 may be made up of multiple flow circuits that may or may not be in flow communication with each other. As an example only, FIGS. 4 and 5 provides perspective views of a blade 400 including an internal cooling circuit 402 with multiple flow circuits in phantom and reverse images of the internal cooling circuit 402 formed in the blade 400 are provided, according to an embodiment. Here, the internal cooling circuit 402 may include a suction side flow circuit 404, a pressure side flow circuit 406, and a center-body flow circuit 408. The suction side flow circuit 404 receives air and directs the air along the suction side wall 410, along the tip wall 418 and along the rear portion of the pressure side wall 414 which exits the flow circuit via tip edge channels 420 and/or through tip wall openings 422, if included, and/or through trailing edge opening 412. The pressure side flow circuit 406 receives air and directs the air along the pressure side wall 414 and out the pressure wall openings 416. The center-body flow circuit 404 receives air and directs the air towards the leading-edge wall 424 and exits through series of openings on the leading edge wall (not illustrated). In other embodiments, the air in the flow circuits 404, 406, 408 may exit the internal cooling circuit 402 via other holes formed in the blade 400 (not illustrated). In yet another embodiments, the air can enter the blade through other flow circuits and exit via other openings which are not illustrated in FIGS. 4 and 5.

Figure 6:
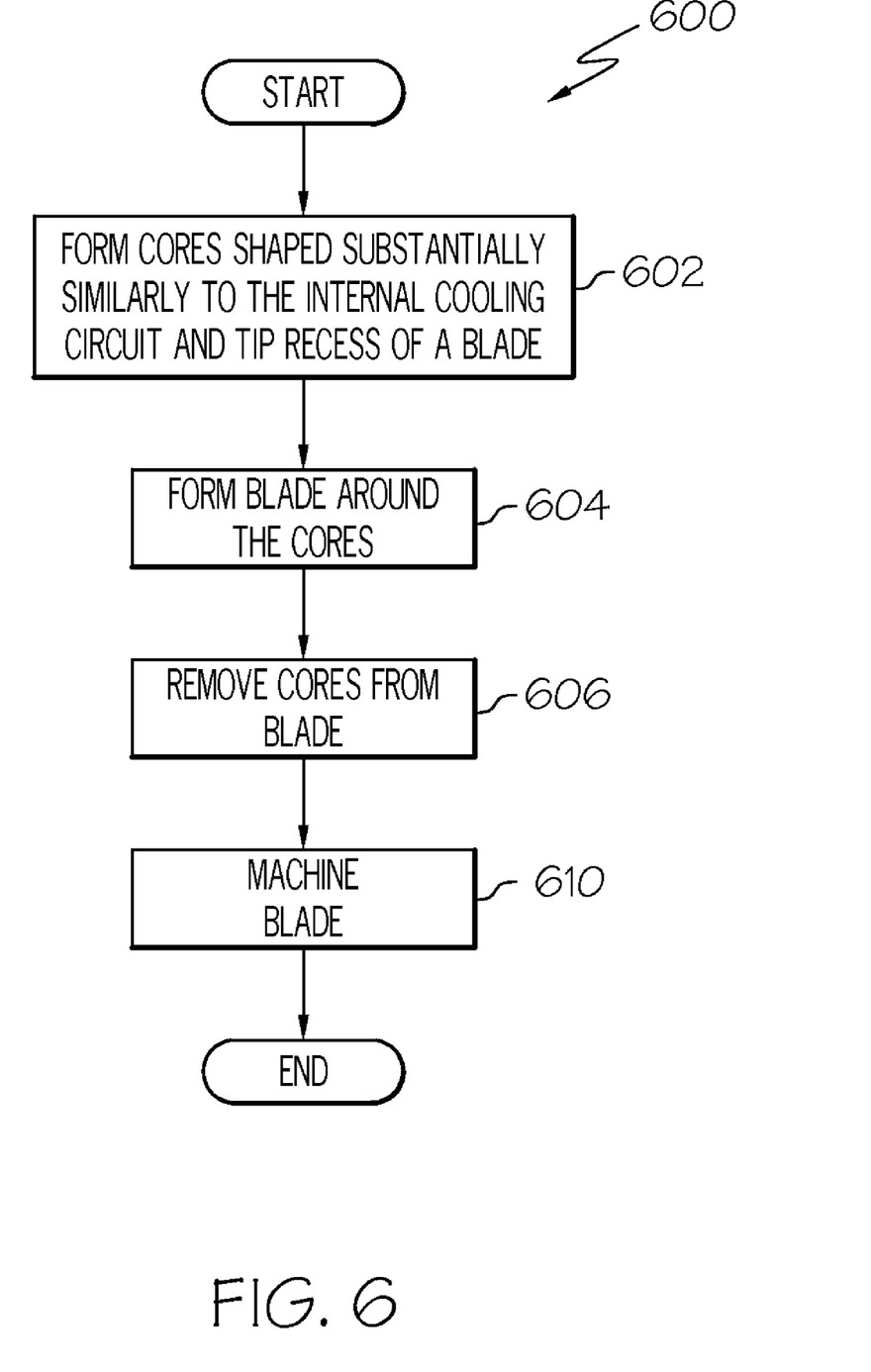
FIG. 6 is a flow diagram of a method of manufacturing a turbine blade, according to an embodiment.

No matter the particular shape of the internal cooling circuit 402, the turbine blades 100, 400 may be produced using a method 600 illustrated in FIG. 6. First, cores are formed that are shaped at least substantially similarly to an internal cooling circuit and a tip recess, step 602. The blade is then formed around the cores, step 604. The cores are then removed from the blade, step 606, and the blade undergoes final machining, step 608. Each of these steps will now be discussed in more detail below.

As briefly mentioned above, at least a portion of the cores are first formed and are shaped substantially similarly to the blade internal cooling circuit and at least a portion of the tip recess, step 602. In one exemplary embodiment, one or more cores may be used to for an internal circuit core. The internal cooling circuit core is formed to define features of the internal cooling features of a blade. In an example, some of the internal cooling circuit cores may be shaped substantially similarly to the reverse images of the internal cooling circuit 402 depicted in FIG. 5. The tip recess core is formed to define at least a portion of the tip recess. The cores may be formed from ceramic, or another material conventionally used for cores in a casting process, such as a lost wax casting process.

After the cores are formed, the blade is formed around the cores, step 604. In this regard, the cores may placed in a wax die and substantially covered in wax to form a wax pattern. Wax may be placed in the wax die in any suitable conventional manner, such as by, for example, injection. After the wax pattern is formed, it is dipped in a ceramic slurry and dried to form a ceramic outer mold. In an embodiment, the ceramic slurry preferably substantially covers the wax pattern and cores. After the ceramic slurry dries, it is de-waxed. As a result, the ceramic outer mold forms a cavity within which the cores are disposed.

Molten metal is injected into the cavity to at least partially surround the cores. The molten metal may be made up of any one of numerous metal materials suitable for forming the blade, such, as, for example, nickel-based superalloys. In any case, the ceramic outer mold and cores may be placed in a furnace, heated, and filled with the molten metal, in an embodiment. After the cavity is sufficiently filled with the molten metal, the metal may be cooled. For example, the metal may be cooled such that an equi-axed, directionally solidified, or single crystal material is formed. The cooled metal forms an intermediate casting. The ceramic outer mold is then removed to expose the blade, and a top portion of the intermediate casting is machined away to expose a portion of the core. Removal may occur by either machining away the ceramic outer mold, or by chemically melting the ceramic outer mold with a suitable material.

Then, the cores are removed, step 606. In one embodiment, the cores are chemically removed using a suitably formulated composition that dissolves the cores. The core material is typically leached out using a traditional caustic solution, such as sodium or potassium hydroxide, as is common in the core removal industry. Verification of core removal may be accomplished using a combination of water flow, air flow, X-ray, and thermal imaging inspections. After the cores are removed, cavities are left forming the internal cooling circuit and the tip recess and the blade is exposed.

The blade is then machined to a final shape, step 608. In an embodiment, an edge of a suction side wall tip section of the blade may be machined to remove material therefrom so that the suction side wall tip section is shorter than a pressure side wall tip section. Material may be removed until a height difference exists between the tip section of the suction side wall and the tip section of the pressure side wall. Suitable height differences may include measurements between about 0.05 mm and about 0.40 mm. In another embodiment, the tip section of the suction side wall may be about 0.12 mm shorter than the pressure side wall tip section. In still other embodiments, the height difference may be smaller or larger.

The blade may be further machined to incorporate openings therein. For example, in some embodiments, the openings are machined into the walls of the blade. In one embodiment, one or more tip edge channels may be formed that extend from an edge of a tip section of a suction side wall to the internal cooling circuit. In another embodiment, one or more pressure wall openings may be formed along a pressure side wall proximate a tip wall. In still yet another embodiment, one or more tip wall openings may be formed through a tip wall. The openings may be machined using any one of numerous machining techniques. For example, the openings may be laser drilled, electro-discharge milled, or casted as extensions to the internal cores. It will be appreciated that the tip edge channels, pressure wall openings, and tip wall openings may be machined to have dimensions similar to those described above.

Hence, a blade having improved tip wall cooling over conventional blades has now been provided. The improved tip wall cooling may be used in conjunction with blades having any one of numerous internal cooling circuit shapes. For example, the improved tip wall cooling may be used with internal cooling circuits having a single flow circuit or multiple flow circuits. In particular, by including tip edge channels on the suction side walls of the blade, the tip wall and the tip sections of the suction and pressure side walls may be better able to withstand engine operating temperatures as compared with conventional blades. Additionally, the use of a shorter suction side wall tip section not only allows the taller tip section of the pressure side wall to protect the suction side wall tip section from direct exposure to the engine operating temperatures, in some cases, but may also minimize a likelihood that material around the tip edge channels may melt and block the channels in the event of blade tip rub against surrounding hardware. Moreover, the method for forming the improved blade may be incorporated into existing manufacturing processes and may be relatively simple and inexpensive to implement.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A turbine blade, comprising:
a convex suction side wall including a first tip edge;
a concave pressure side wall opposite the convex suction side wall and including a second tip edge;
a tip wall extending between the convex suction side wall and the concave pressure side wall and coupling the convex suction side wall to the concave pressure side wall, the tip wall is recessed from the first tip edge of the convex suction side wall and the second tip edge of the concave pressure side wall to define a suction side wall tip section and a pressure side wall tip section, the suction side wall tip section being shorter and thicker than the pressure side wall tip section;
an internal cooling circuit formed at least partially between the convex suction side wall, the concave pressure side wall, and the tip wall; and
a plurality of tip edge channels formed through the first tip edge of the convex suction side wall that extend to the internal cooling circuit.

2. The turbine blade of claim 1, further comprising:
a plurality of pressure wall openings formed through the concave pressure side wall to communicate with the internal cooling circuit.

3. The turbine blade of claim 2, wherein:
the internal cooling circuit comprises a pressure side flow circuit and a tip flow circuit;
the plurality of tip edge channels are in flow communication with the tip flow circuit; and
the plurality of pressure wall openings are in flow communication with the pressure side flow circuit.

4. The turbine blade of claim 2, wherein the concave pressure side wall has an outer surface and at least one opening of the plurality of pressure wall openings is formed through the concave pressure side wall at an angle relative to the outer surface thereof.

5. The turbine blade of claim 1, wherein the suction side wall tip section is between about 0.05 mm and about 0.40 mm shorter than the pressure side wall tip section.

6. The turbine blade of claim 1, wherein at least one channel of the plurality of tip edge channels has a discharge angle that is non-perpendicular to the first tip edge of the convex suction side wall.

7. The turbine blade of claim 1, wherein:
the internal cooling circuit comprises a pressure side flow circuit and a tip flow circuit; and
the plurality of tip edge channels are in flow communication with the tip flow circuit.

8. The turbine blade of claim 1, further comprising a plurality of tip wall openings formed in the tip wall in communication with the internal cooling circuit.

9. The turbine blade of claim 2, wherein at least one opening of the plurality of pressure wall openings has a discharge angle that is substantially non-perpendicular to the concave pressure side wall.

10. A method of manufacturing a turbine blade having an internal cooling circuit and an airfoil shape defined by a convex suction side wall, a concave pressure side wall, a tip wall, a leading edge, a trailing edge, a root and a tip recess, the convex suction side wall, the concave pressure side wall, and the tip wall each including a surface that defines at least a portion of the internal cooling circuit, the convex suction side wall having a first tip edge and the concave pressure side wall having a second tip edge, the tip wall recessed from the first tip edge of the convex suction side wall and the second tip edge of the concave pressure side wall to define a suction side wall tip section and a pressure side wall tip section, respectively, the suction side wall tip section being shorter in height and thicker than the pressure side wall tip section, the method comprising the steps of:
forming cores shaped substantially similarly to the internal cooling circuit and to a portion of the tip recess;
forming the turbine blade around the cores, the turbine blade having an outer surface defined by the convex suction side wall, the concave pressure side wall, the tip wall, the leading edge, the trailing edge, the root and tip recess, the convex suction side wall, the concave pressure side wall, and the tip wall each including the surface that defines the at least a portion of the internal cooling circuit, the convex suction side wall having the first tip edge and the concave pressure side wall having the second tip edge, the tip wall spaced apart from the first tip edge of the convex suction side wall and the second tip edge of the concave pressure side wall to define the suction side wall tip section and the pressure side wall tip section;
removing the cores from the turbine blade to expose the internal cooling circuit of the turbine blade;
removing a portion of the suction side wall tip section such that the suction side wall tip section is shorter in height than the pressure side wall tip section; and
machining at least one tip edge channel through the convex suction side wall from the first tip edge thereof to the internal cooling circuit of the turbine blade.

11. The method of claim 10, further comprising the step of: machining at least one pressure wall opening through the concave pressure side wall to communicate with the internal cooling circuit.

12. The method of claim 10, wherein the step of removing a portion of the suction side wall tip section comprises removing a portion of the suction side wall tip section such that the suction side wall tip section and the pressure side wall tip section have a height difference of between about 0.05 mm and about 0.40 mm.

13. The method of claim 10, wherein the step of machining the at least one tip edge channel comprises forming the at least one tip edge channel at a discharge angle that is substantially non-perpendicular to the first tip edge.

14. The method of claim 10, wherein the internal cooling circuit comprises a flow circuit and the flow circuit comprises a pressure side cooling circuit and a tip cooling circuit and the step of machining the at least one tip edge channel comprises machining the at least one tip edge channel to be in flow communication with the tip cooling circuit.

15. The method of claim 10, further comprising the step of forming a tip wall opening in the tip wall in communication with the internal cooling circuit.

* * * * *